United States Patent
Leopold et al.

[15] 3,687,492
[45] Aug. 29, 1972

[54] SERVICE PIPE COUPLING JOINT

[72] Inventors: Wilbur R. Leopold; Frank C. Hackman; Carl E. Floren; Wallace E. Gould, all of Decatur, Ill.

[73] Assignee: Mueller Co., Decatur, Ill.

[22] Filed: Dec. 16, 1969

[21] Appl. No.: 885,462

[52] U.S. Cl..................285/247, 18/19 BE, 29/522, 264/249, 285/386
[51] Int. Cl............................F16l 33/22, F16l 47/00
[58] Field of Search........285/382.5, 110, 386, 382.4, 285/238, 239, 240, 246, 247, 260

[56] References Cited

UNITED STATES PATENTS

| | | |
|---|---|---|
| 2,991,093 | 7/1961 | Guarnaschelli............285/110 |
| 2,522,194 | 9/1950 | Richardson.........285/382.5 X |
| 3,191,973 | 6/1965 | Guarnaschelli............285/110 |
| 2,545,168 | 3/1951 | Richardson.........285/382.5 X |
| 3,275,344 | 9/1966 | Kendt....................285/110 X |
| 3,502,355 | 3/1970 | Demler et al..............285/110 |
| 646,590 | 4/1900 | Williams....................285/247 |
| 3,408,098 | 10/1968 | Wilson......................285/247 |

FOREIGN PATENTS OR APPLICATIONS

| | | |
|---|---|---|
| 576,544 | 4/1946 | Great Britain..........285/382.5 |
| 1,246,278 | 10/1960 | France......................285/247 |

*Primary Examiner*—Thomas F. Callaghan
*Attorney*—Cushman, Darby & Cushman

[57] ABSTRACT

A service pipe coupling or joint for use in fluid distribution systems and the method and tool for making the same, the coupling or joint utilizing a plastic pipe, a flare-type coupling nut for coupling the plastic pipe into a distribution system, the coupling nut cooperating with a tubular body member which may be another pipe, a valve, or other fitting. The plastic pipe has its end portion cold flared beyond its elastic limit or memory into an annular upset bead-like portion terminating in an inwardly turned lip, the annular upset bead-like portion trapping the plastic pipe axially with respect to the coupling nut. The application of the tubular body to form the coupling or joint further forms the bead-like flare to provide a seal and packing and to increase the resistance of pipe pullout from the joint.

7 Claims, 11 Drawing Figures

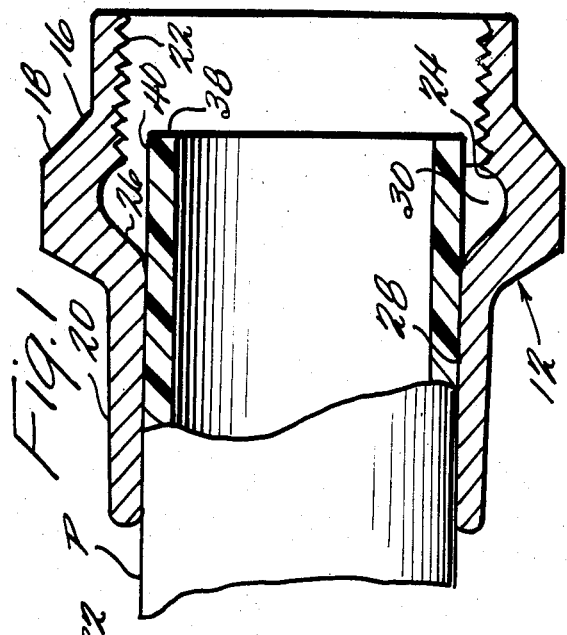
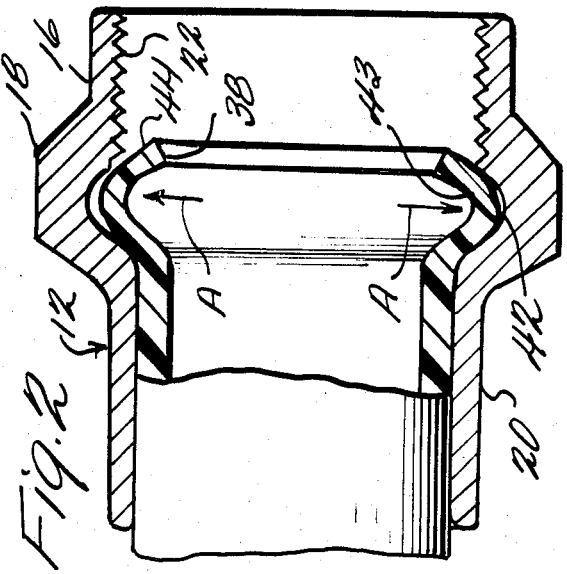
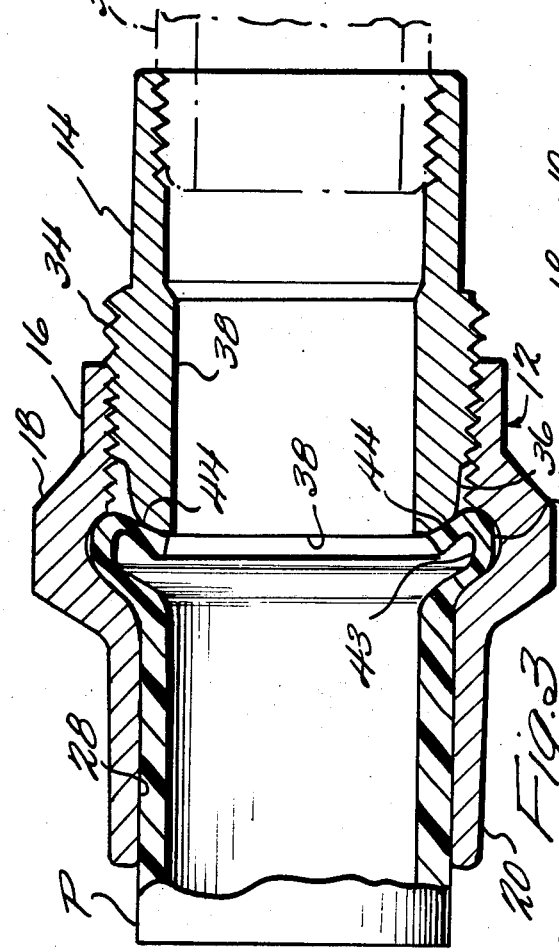
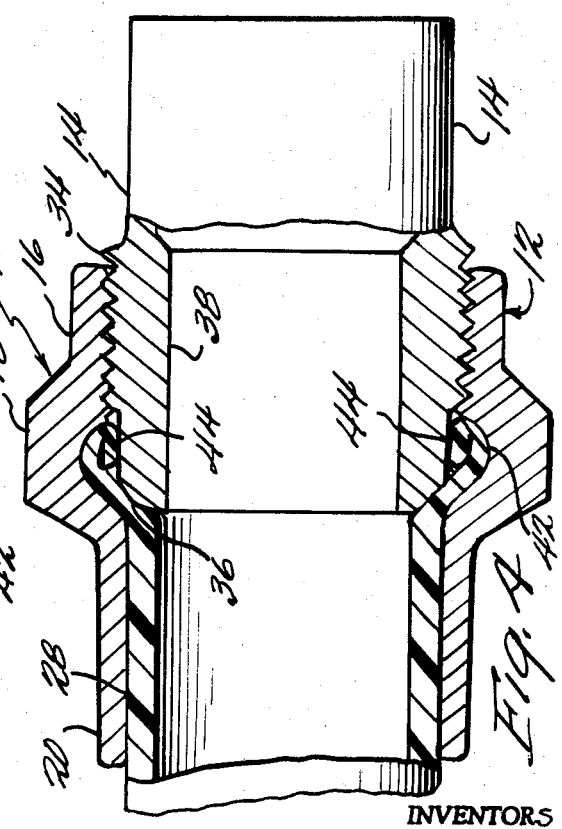

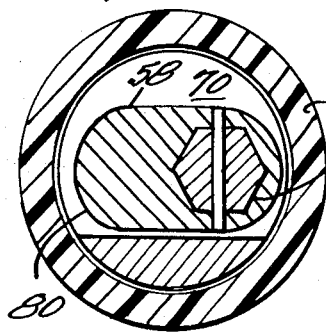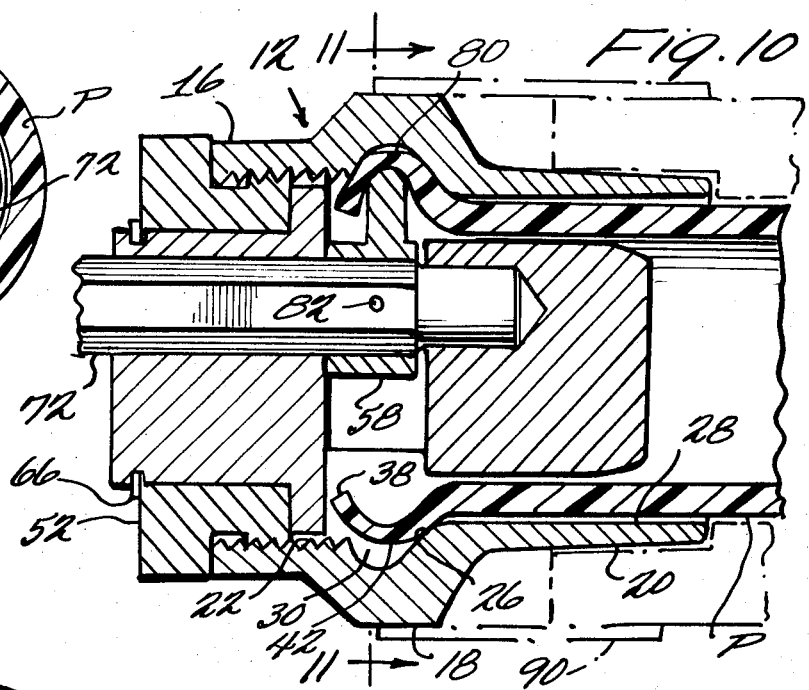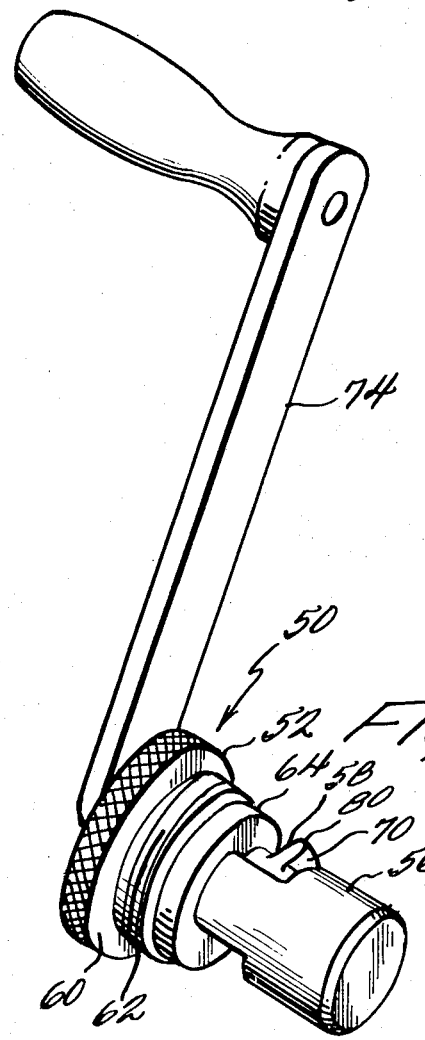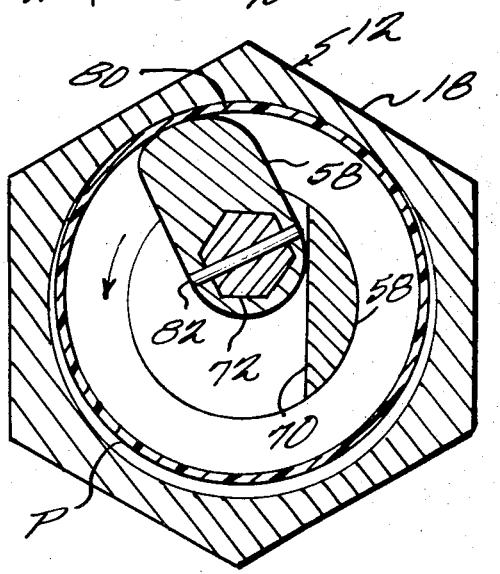

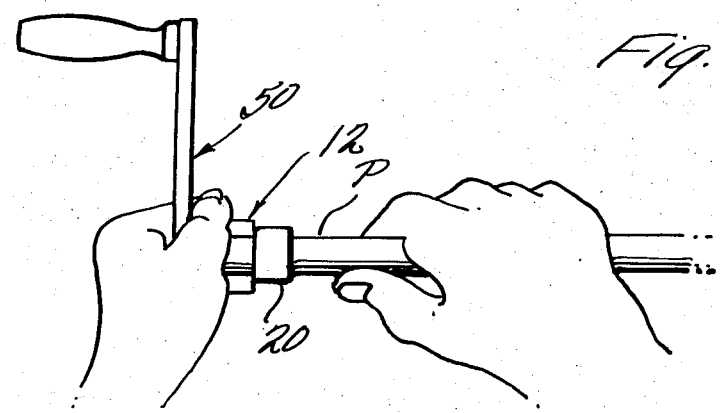
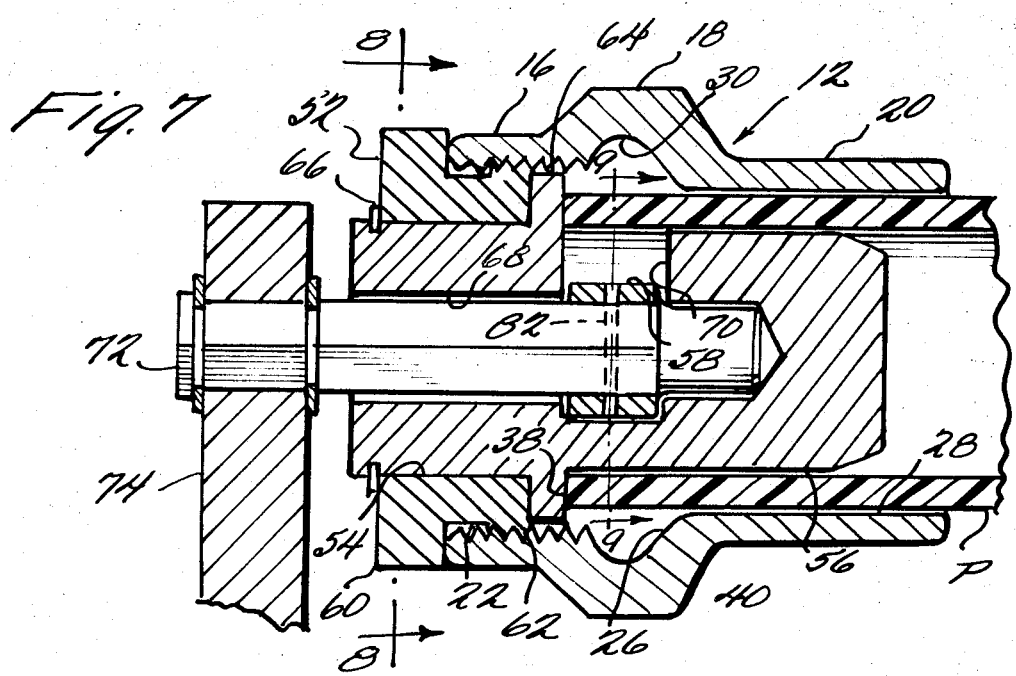
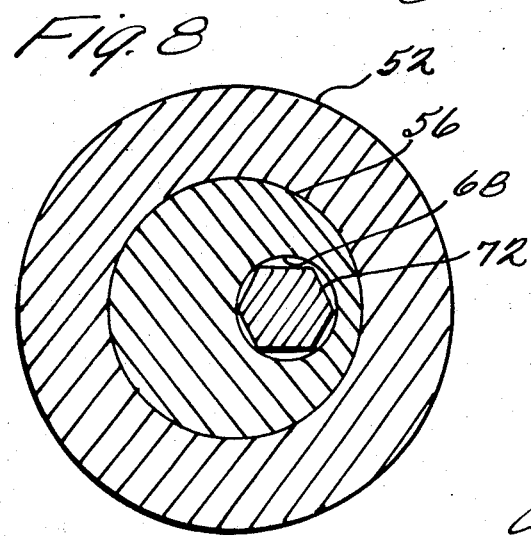

SERVICE PIPE COUPLING JOINT

The present invention relates to pipe couplings or joints, and the method and tool for making the same, the coupling or joint utilizing a flare-type nut having the end of a plastic pipe cold flared therein and further formed by application of a tubular body member or fitting when the joint is completed. More particularly, the invention is concerned with providing an improved flared end on plastic pipe inserted into a coupling nut, the flared end resulting in maintaining an improved pressure seal and packing when the joint is made up as well as greater tensile resistance to failure by pipe pullout of the joint.

Pipe joints or couplings utilizing a flare nut for receiving the flared end of plastic pipe and a tubular body member are well known in the art but such constructions presently in use usually have disadvantages in the makeup of the joint or in the use of the joint over a long period of time where the joint may or may not be subject to differentials in temperature. In the prior joints or couplings, the end of the plastic pipe was flared outwardly against an inwardly extending annular shoulder provided in the flare nut. Then a tubular body member or fitting having a nose portion for cooperating with the inwardly extending annular shoulder in the flare nut was threaded into the flare nut with the nose portion exerting pressure on the flared end of the pipe to form a seal and cause a cold flow of material both forwardly and rearwardly of the pipe at the point of contact with the purpose of at least obtaining an enlargement of the terminal end of the pipe in an area between the flare nut and the tubular body member. Such couplings or joints are shown in the prior U.S. Pats. NO. 509,743, Nov. 28, 1893, Lane; No. 2,290,890, July 28,1942, Parker; No. 2,316,711, Apr. 13, 1943, Parker; No. 3,023,033, Feb. 27, 1962, Koch; and No. 3,408,898, Oct. 29, 1968, Wilson. In each of these arrangements in which the plastic pipe was either a soft flowable metal such as copper or lead or a synthetic plastic such as polyethylene or polypropylene, the cold flow of material from the flared end of the pipe controlled the amount of material which could be packed between the flare nut and the tubular body fitting at the forward end of the pipe and the wall thickness of the pipe at the point of contact and this limited the tensile resistance to failure by pullout of the joint. Additionally, there was no resiliency in the terminal end of the plastic pipe which would assist the tubular body member or fitting in maintaining a pressure seal. In situations where the plastic pipe was made from a synthetic resin material, heat was applied to form the initial flare and unless the operator used skill and care, the application of heat caused surface deterioration and oxidation of the pipe, thus, weakening the joint.

The present invention relates to an improved method and/or coupling or joint for plastic pipe in which the coupling or joint when made up has more material packed between the coupling nut and the tubular body member or fitting in an area at the end of the pipe forward of the contact pressure area on the pipe applied by coaction of the coupling nut and the tubular body member.

Ancillary to the preceding object, it is a further object of the present invention to provide an improved method and/or coupling or joint in which the increased material of the plastic pipe provided forward of the area of contact does not necessarily require the reduction of wall thickness of the plastic pipe at the area of contact.

Still another object of the present invention is to provide an improved method and/or coupling or joint for plastic pipe in which the plastic pipe may be cold flared while in the coupling nut to axially trap the same prior to make up of the joint.

Ancillary to the preceding object, it is a further object of the present invention to flare plastic pipe while in a coupling nut, the flare being an annular upset bead-like portion on the end portion of the plastic pipe and having an inwardly turned or extending lip which is capable of being folded back against the interior of the bead-like portion upon completion of the coupling or joint so as to provide more material in this area as well as providing resiliency of such material so as to assist the tubular body member or fitting in maintaining a pressure seal on the plastic pipe with respect to the coupling nut.

Still another object of the present invention is to provide a method of and/or means for cold flaring plastic pipe to a flare-type coupling nut, the flared bead-like portion terminating in an inturned lip and bead-like portion loosely anchoring the pipe axially relative to the nut.

Ancillary to the immediately preceding object, it is still another object of the present invention to provide a coupling or joint utilizing the flare-type coupling nut with an annular upset bead-like flare on a plastic pipe, the joint when made up having increased pullout strength as well as improved sealing characteristics over greatly extended periods of time.

Still another object of the present invention is the provision of an improved pipe coupling or joint of the type described which can be completed in the field with a minimum of degree of skill on the part of an operator.

Ancillary to the immediately preceding object, it is a further object of the present invention to provide a method of making such a coupling or joint which eliminates the need for heat to soften the plastic pipe prior to or during the making of the flare which could result in the possibility of deterioration and/or oxidation of the plastic pipe or possible damage to the coupling nut.

A still further object of the present invention is to provide an improved coupling or joint for plastic pipe in which more material on the end of the plastic pipe can be positioned between the coupling nut and the tubular body member or fitting thereby reducing the voids that can permit plastic creep which in turn would reduce the sealing pressure applied on the pipe between the nut and the tubular body member as well as the pull out strength of the joint.

Another object of the present invention is to provide an improved tool or apparatus for cold flaring the end of a plastic pipe while the plastic pipe is positioned within a coupling nut, the tool upsetting an annular bead-like portion on the end plastic pipe at a predetermined distance from the terminal edge of the pipe so that the bead-like portion is provided with an inwardly extending lip that has not been subjected to stresses beyond the elastic limit or memory of the material of the pipe.

Ancillary to the immediately preceding object, it is a further object to provide an improved tool which is fixedly supported on a coupling nut and which provides means for properly positioning the undeformed plastic pipe in the coupling nut prior to the swaging action of the tool to upset an annular bead-like portion of the plastic pipe. Further to the immediately preceding, it is an object of the present invention to provide a tool which will swage an upset portion on a plastic pipe within a coupling nut beyond the elastic limit of the material of the pipe in an area spaced from the terminal edge of the pipe whereby an inturned annular lip is provided on the pipe which may be folded back against the interior of the bead-like portion and yet have some springback.

While the present invention, as broadly described above, may utilize plastic pipe made of metal such as copper or lead pipe, the invention is particularly adaptable to plastic pipe made from synthetic resins such as polyethylene, polyvinyl chloride, polybutylene, and polypropylene and the like having either a normal molecular weight or a high molecular weight and the invention will be described in detail below with reference to such pipe. Additionally, it should be understood that manufacturers today make synthetic resin pipe in dimensions corresponding to two sizes of pipe, either iron pipe sizes or copper pipe sizes and the present invention is capable of use with either type of synthetic resin pipe.

The above and other objects and advantages of the present invention will appear more fully in the following detailed description of the invention, claims, and accompanying drawings in which:

FIGS. 1 to 4 inclusive represent vertical sectional views through the coupling nut, plastic pipe and tubular body member of the present invention illustrating step-by-step the method of making and completing the improved coupling or joint;

FIG. 5 is a perspective view of the improved tool or apparatus for swaging an annular upset bead-like portion on the end of the plastic pipe while the pipe is positioned within the coupling nut;

FIG. 6 illustrates diagrammatically the insertion of the plastic pipe into the coupling nut after the tool of FIG. 5 has been attached to the coupling nut;

FIG. 7 is an enlarged fragmentary sectional view illustrating the swaging tool positioned in the coupling nut and the undeformed plastic pipe inserted into the coupling nut to a proper position, the view being taken prior to operation of the tool;

FIG. 8 is a sectional view taken on the line 8—8 of FIG. 7;

FIG. 9 is a view taken on the line 9—9 of FIG. 7 and illustrating the swaging tool with the swaging arm in the retracted or non-swaging position;

FIG. 10 is a fragmentary vertical sectional view similar to FIG. 7 but illustrating the swaging tool or apparatus in operation, the view further illustrating in phantom lines means for fixedly clamping the plastic pipe to the coupling nut during the swaging operation and;

FIG. 11 is a vertical sectional view substantially on the line 11—11 of FIG. 10.

Referring now to the drawings wherein like characters or reference numerals represent like or similar parts, and in particular to FIGS. 1 through 4 inclusive, there is disclosed a series of views illustrating the method of progressively making up of the coupling or joint generally designated at 10 (FIG. 4) of the present invention. Before describing the coupling or joint 10 and the method of making the same in detail, a detailed description of the flare-type coupling nut 12 and the tubular body member or fitting 14 will be given.

The flare-type coupling nut 12 is generally similar to the American Water Works Association standard coupling nut and includes an enlarged end portion 16 having at least a portion thereof as indicated at 18, which is hexagonal in shape for reception of a wrench or other tool, and a reduced sleeve portion 20. The coupling nut 12 is provided with interior threads 22 along a portion of its length in the enlarged end portion 16. From a land 24 at the inner end of the threads 22, the coupling nut 12 is provided with an inwardly extending annular frusto-conical shoulder 26 which merges into a bore 28 in the reduced sleeve portion 20. Preferably the land 24 extends axially a short distance and is provided with a maximum diameter greater than the root diameter of the threads 22 so as to define an annular recess 30 which is arcuate or curved in axial section, the recess 30 merging into the frusto-conical shoulder 26 as described in the aforementioned Lane patent. The bore 28 of the coupling nut 12 has a maximum diameter less than the crest diameter of the threads 22 in order to insure the provision of the inwardly extending annular frusto-conical shoulder 26 from the land 24 so that there is an inwardly extending straight or flat surface in axial section for a portion of the exterior surface of the pipe P to bear against.

The tubular body member 14, which cooperates with the coupling nut 12, is illustrated as a straight coupling member for threadedly receiving an iron or copper pipe 32 (shown in phantom lines in FIG. 3) or it may be an outlet on a valve, corporation stop, or other fitting. The end portion of the tubular body member 14 is provided with exterior threads 34 which are threadedly received in the interior threads 22 of the coupling nut and a nose portion 36 projecting forwardly from the threads 34. The nose portion 36 has a maximum diameter greater than the diameter of bore 28 but no greater than the crest diameter of the threads 34 and is generally convexly curved as is standard on American Water Works Association's standard male fittings. Of course, the nose portion 36 could be frusto-conical rather than convexly curved. An axial bore 38 is provided in the tubular body member 14, the bore 38 being coaxial with the bore 28 in the coupling nut 12 when the joint 10 is formed.

Having described the coupling nut 12 and the tubular body member or fitting 14 in detail, although they are substantially standard in the art, the improved joint or coupling 10 utilizing these elements and the method of making the same will now be described in detail.

Referring first to FIG. 1, the undeformed end portion 40 of a plastic pipe P is inserted axially into the bore 28 of the sleeve portion 20 of the coupling nut 12. As mentioned above, the plastic pipe P is preferably made from a synthetic resin material such as polyethylene, polyvinyl chloride, polybutylene, polypropylene or the like of either average or high molecular weight. The terminal edge 38 of the plastic pipe P is positioned within the coupling nut 12 in a transverse plane through the coupling nut just forward of the recess 30 at least past one or more threads 28 in the coupling nut 12. The exact positioning of the terminal edge 30 of the plastic pipe P is determined by the wall thickness of the pipe and the volume of the space or chamber defined between the recess 30 of the nut 12 and periphery of the nose portion 36. With the plastic pipe P so positioned relative to the coupling nut 12, it is then temporarily restrained from axial movement relative to the coupling nut.

Referring now to FIG. 2 of the drawing, a radial outwardly directed pressure, represented by the arrows A, is applied increasingly and progressively about the circumference of an interior area of the plastic pipe P in an area spaced from the terminal edge 38 of the same and in a plane transverse of the axis and extending through the center of annular curved recess 30 of the coupling nut 12. The radial pressure A is progressively moved about the interior circumference and increased until it deforms the plastic pipe P in the area of application to a point beyond the elastic limit or memory of the material from which the pipe is made. By such an application of radial pressure to the interior of the plastic pipe P, an annular upset bead-like portion 42 is formed adjacent the end portion of the plastic pipe P generally as shown in FIG. 2. The bead-like portion 42 is provided with an inturned annular lip 44 terminating in the edge 38. The material of the lip 44, at least for the most part, has not been subjected to pressure which would deform it beyond its elastic limit. The bead-like portion 42 need only be upset to a position where it has an outside diameter greater than the crest diameter of the threads 22 and the diameter of the bore 28 and thus the pipe P will be loosely held within the coupling nut 12 although it will be axially restrained relative to the coupling nut so that it will be properly positioned when the joint 10 is made up.

Referring now to FIG. 3, it will be noted that the tubular body member 14 is illustrated as being threaded into the coupling nut 12 with the bead-like portion 42 having been previously formed on the end of the pipe P and the pipe P thus loosely restrained in the coupling nut. The nose portion 36 will begin to first engage the exterior surface of the inturned lip 44 and, as the body member 14 is further threaded into the coupling nut 12, the nose portion 36 will begin to fold the lip 44 back against the interior surface 43 of the bead-like portion 42. In the process of folding the lip 44 back as shown in FIG. 3, it will be appreciated that the opening defined by the terminal edge 38 of the lip 44 will be extended and increase in diameter as it begins to ride outwardly on the curved surface of the nose portion 36. It should be noted at this point, the length of the lip 44 is preferably no greater than the axial length of the recess 30 so that when the lip 44 is folded back against the interior surface 43 of the bead-like portion 42 by the outer periphery of the nose portion 36 of the tubular body member 38, the space or chamber defined by the recess 30 and the peripheral surface of the nose portion 36 is completely filled with none of the lip extending down into the primary sealing area of the joint.

The complete filling of the recess 30 is enhanced by providing the recess with an arcuate or curved shape in axial section and merging this smoothly into the frusto-conical shoulder 26. Consequently, the pullout strength of the completed joint is increased.

Referring now to FIG. 4, which illustrates the completed joint or coupling 10, it will be noted that the tubular body member 14 has been advanced to a position where the leading edge of the nose portion 36 presses against the interior surface of the pipe P in the area of the wall of the bead-like portion 42, thus squeezing the pipe P against the inwardly extending frusto-conical shoulder 26 of the coupling nut to provide a primary annular seal. Since the lip 44 has already been folded back against the interior surface 43 of the bead-like portion 42 and has filled the chamber between the coupling nut 12 and the nose portion 36 of the tubular body member 14, there can be little or no cold flow of the plastic pipe from the area of the pressure seal forward relative to the plastic pipe into the chamber. Consequently, a very tight seal can be effected without too much reduction of thickness in the area of applied pressure, this resulting in the reduction or elimination of plastic creep during the assembly and service life of the coupling or joint. By packing more material into the chamber between the recess 30 of coupling nut 12 and the nose portion 36 of the tubular body member 14 prior to the application of sealing pressure by the leading edge of the nose portion 36 insures the elimination of the weakening of the pipe wall at the point of pressure application and results in very high pullout strength.

Additionally, it should be noted that, when the lip 44 is folded back to the position shown in FIG. 4, it will still have some springback capabilities should the tubular body member 14 be removed from the coupling nut 12 as at least a portion of the lip had not been subjected to pressures greater than pressures necessary to cause deformation which exceeds the elastic memory of the material of the lip. By having the lip provided with some springback capabilities, the bead-like portion 42 and the lip 44 in effect become a packing providing a further or secondary seal between the coupling nut 12 and the tubular body member 14 as well as a means for helping the tubular body member or fitting 14 to maintain the primary pressure seal on the pipe by the leading edge of the nose portion 36.

Referring now to FIGS. 5 through 11 inclusive, there is disclosed an improved tool or apparatus generally indicated at 50 for forming or swaging the bead-like portion 42 on the end of the plastic pipe P while the plastic pipe P is inserted into the coupling nut 12. In more detail, the tool or apparatus 50 includes a tubular nut or body member 52 having an axial bore 54 therethrough of diameter substantially equal to the interior diameter of the pipe P, a mandrel 56 rotatably supported within the bore of the tubular nut 52 and a cam arm member 58 partially rotatable relative to and carried by the mandrel 56. The tubular nut 52 is provided with an annular flange 60 and exterior threads 62 for reception into the interior threads 22 of the coupling nut 12. The flange 60 provides a means of bottoming the nut 52 against the coupling nut 12 to insure proper positioning of the tool relative the nut. The mandrel 56 is substantially cylindrical and has a diameter no greater than the interior diameter of the pipe P as the end portion must extend into the pipe. As shown in FIGS. 5 and 7, the mandrel 56 is provided with an annular flange 64 having a diameter greater than the diameter of the pipe P, the flange 64 being positioned intermediate the ends of the mandrel so that the flange 64 abuts against the inner edge of the nut 52. A lock ring 66 axially positions the mandrel 56 with respect to the nut 52 but permits relative rotation of the two members. Mandrel 56 is provided with a bore 68 having an axis parallel to but eccentric of the axis of the mandrel. A transverse slot 70 is provided in the mandrel 56, the slot 70 intersecting the bore 68. Slot 70 is positioned on the mandrel so that when the tool 50 is inserted on the coupling nut 12, the slot lies in a plane passing through the land or recess 30 in the coupling nut.

A rod member 72, which is hexagonal in cross section but which has a major diameter less than the diameter of the bore 68, extends through the bore 68 and slot 70. Mounted on the outer end of the rod 72 is a crank handle 74, whereas mounted on the portion of the rod extending through the slot 58 is the cam arm member 58 (FIGS. 9, 10, and 10). A pin 82 extending through the dam arm member 58 and the rod 72 anchors the same to the rod as well as anchoring the rod axially relative to the mandrel. The cam arm member 58 has its outer end 80 curved in axial section as well as in transverse section so that there are no sharp edges to scratch or cut the interior of the plastic pipe P.

As will now be apparent from the drawing and the immediately preceding description, rotation of the handle 74 in one direction will cause the cam arm member 58 to rotate relative to the mandrel 56 until it reaches a position where it abuts the bottom wall of the slot 70 and is stored completely within the slot 70 as shown in FIG. 9. Continued rotation of the handle in the same direction will then merely rotate the mandrel and the cam arm member 58 as a unit relative to the nut 52. Rotation of the handle 74 in the reverse direction to that just described will first cause the cam arm member 58 to swing outwardly of the slot 70 and the periphery of the mandrel 56 as shown in FIG. 11 until the outer edge 80 of the cam member 58 engages the interior of the pipe P to be swaged or until it is stopped by the bottom wall of the slot 70. Continued rotation in the same direction will then move the cam arm member 58 and the mandrel 56 as a unit with the cam arm progressively swinging out as the bead 42 is being formed until it reaches its maximum position as it swages a surface in which it is engaged.

Referring now to FIG. 6, it will be noted that the tool or apparatus 50 has been fixedly attached to the coupling nut 12 as shown in vertical section in FIG. 7. When this has been accomplished, the end portion of the plastic pipe P is then inserted axially through the sleeve portion 20 of the nut until its edge 38 abuts the flange 64 on the mandrel. When the pipe P abuts the flange 64, then the pipe is properly positioned within the coupling nut 12 and is ready to have the bead-like portion 42 upset from its undeformed end 40. It will be noted that the inner portion of the mandrel is within the end portion of pipe P so as to give added support to the pipe adjacent the area where the swage or upset is to be made.

Referring now to FIGS. 10 and 11, once the pipe P has been properly positioned within the coupling nut 12, then any suitable clamping means 90 shown in phantom lines may be used to clamp the pipe P and the coupling nut 12 relative to one another so that the pipe P cannot prematurely back out of the sleeve 20 during the swaging operation. The handle 74 of the tool or apparatus 50 is then turned to a position extending the cam arm member 58 out of the slot 70 in the mandrel 56. The relative rotational movement between the cam arm member 58 and the mandrel 56 will continue until the outer edge of the cam arm member 58 engages the interior wall of the pipe P. Further rotational movement of the handle 74 will cause the mandrel 56 and the cam arm member 58 to rotate as a unit with pressure being applied by the cam arm member radially outwardly to the interior of the pipe P to upset the same about its interior circumference. Of course, as the bead-like portion 42 begins to upset, the cam arm member will swing a little further out of the slot 70 to apply more pressure until such time the bead-like portion 42 is upset to the proper or desired diameter. Usually it only requires two to five turns on the crank handle 74 to provide the upset bead-like portion 42 on the end of the pipe which will loosely anchor the pipe in the coupling nut 12. When this has been accomplished, then the clamping means 90 is removed as well as the tool 50 and the joint 10 described above can be assembled as shown in FIG. 4.

The foregoing description of the invention effectively accomplishes the objects and advantages enumerated and the scope of the invention is defined in the appended claims.

What is claimed is:

1. A pipe joint comprising: a coupling nut having interior threads for a part of its length, an interior recessed annular wall at the inner end of said threads, an inwardly extending annular shoulder extending from said recessed annular wall, and a bore of less diameter than said interior threads and extending from said shoulder through the remainder of the nut length; a plastic pipe extending through said bore and having its end portion projecting beyond said shoulder, the end portion having an outwardly upset annular bead-like portion terminating in an inwardly turned lip; and a tubular body having exterior threads received in the interior threads of said nut, said tubular body having a nose portion projecting forward of said exterior threads and of less diameter than said exterior threads, said nose portion being defined by a cylindrical portion terminating in an inwardly extending end portion, the exterior of said nose portion together with the interior recessed annular wall and annular shoulder of said nut defining an annular chamber when said nut is threaded on said body, the inwardly extending end portion of said nose portion engaging and reversely folding the lip back against the interior of said upset portion to completely fill said chamber to form a secondary seal about the periphery of the cylindrical portion of said nose portion, and the inwardly extending end portion of said nose portion extending within the folded lip and engaging the interior of the outwardly upset annular bead-like portion and clamping the same against said annular shoulder to form a primary seal without substantial reduction of wall thickness of the pipe.

2. A pipe joint as claimed in claim 1 in which said pipe is a thermoplastic resin material and in which said outwardly upset annular bead-like portion is formed by a cold flare.

3. A pipe joint as claimed in claim 2 in which the radial distance between the exterior of the cylindrical portion of said nose portion and the interior of said recessed annular wall is less than the cumulative thickness of the inwardly turned lip and the outwardly upset annular bead-like portion of the pipe prior to folding of the lip back against the interior of the upset portion whereby when said lip is folded back, the material of said lip and said upset portion is caused to flow axially to fill said chamber.

4. A pipe joint as claimed in claim 1 in which the length of said lip is no greater than the axial width of the recessed annular wall in said coupling nut.

5. A pipe joint as claimed in claim 1 in which said plastic pipe is made from a resin material selected from the group consisting of polyethylene, polyvinyl chloride, polybutylene and polypropylene.

6. A pipe joint as claimed in claim 1 in which said recessed annular wall is curved in axial section and in which said annular shoulder is frusto-conical.

7. A pipe joint as claimed in claim 6 in which the inwardly extending end portion of said nose portion is convexly curved.

* * * * *